United States Patent [11] 3,609,679

[72] Inventors Robert E. Updegraff
  Huntington Beach;
  Robert F. D'Ausilio, La Mirada, both of Calif.
[21] Appl. No. 4,472
[22] Filed Jan. 12, 1970
[45] Patented Sept. 28, 1971
[73] Assignee Threshold Engineering, Inc.
  Fullerton, Calif.

[54] EARTH FIELD VEHICLE DETECTOR
  10 Claims, 8 Drawing Figs.
[52] U.S. Cl. .................................................... 340/38 L,
  340/258 C
[51] Int. Cl. ........................................................ G08g 1/01
[50] Field of Search ........................................... 340/38 L,
  258 R, 258 C

[56] References Cited
  UNITED STATES PATENTS
  3,508,238  4/1970  Baker .......................... 340/38 L X Primary Examiner—William C. Cooper
Attorney—Francis X. Lo Jacono, Sr.

ABSTRACT: A sensing loop is disposed in a fixed position relative to earth, the dimensions of the loop being rather large compared to the length of a vehicle whose movement is to be detected, so that when the vehicle passes over one portion of the loop perimeter in entering the area inside the loop a signal response is produced, and when the vehicle passes over another portion of the perimeter in leaving the loop area another separate response is created. The loop has a low impedance and consists of a small number of conductor turns, typically three or less. For convenience the loop is typically buried beneath the surface of the roadway.

Output pulses from the loop are supplied to a signal processing unit, which amplifies and integrates the pulses so as to exclude all frequencies higher than about 10 Hertz, and at the same time provide an output signal whose amplitude is substantially independent of the vehicle's speed. The processor includes a threshold-responsive trigger circuit which is capable of responding to a signal of sufficient amplitude and of either polarity. An output circuit is actuated by the trigger circuit.

INVENTORS
ROBERT E. UPDEGRAFF,
ROBERT F. D'AUSILIO
BY
*Beehler & Arant*
ATTORNEYS

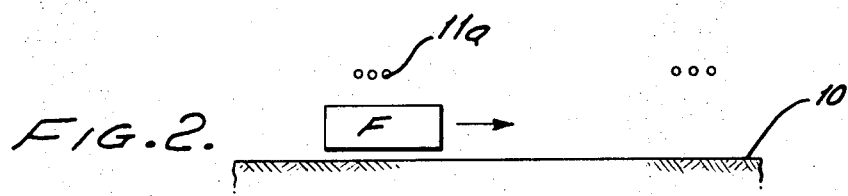
FIG. 2.
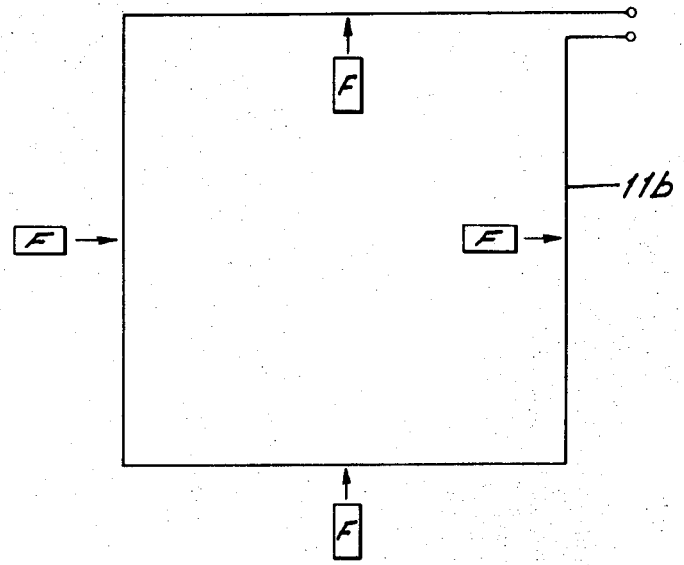
FIG. 3.
FIG. 4.
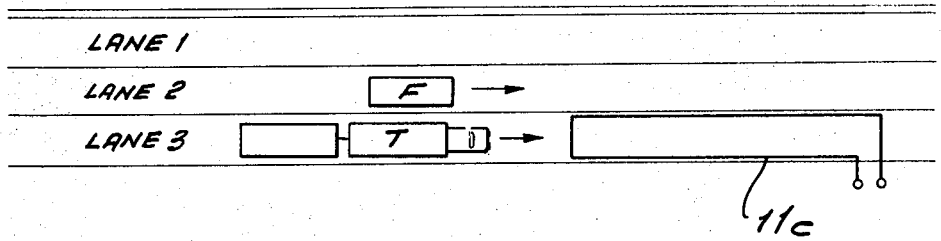
FIG. 5.
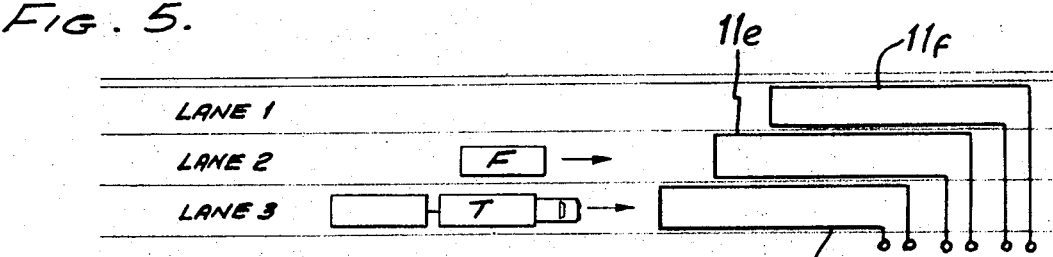
FIG. 6.
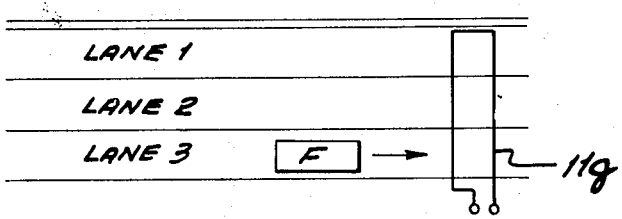
INVENTORS.
ROBERT E. UPDEGRAFF,
ROBERT F. D'AUSILIO
By Beehler & Arant
ATTORNEYS

3,609,679

EARTH FIELD VEHICLE DETECTOR

BACKGROUND OF THE INVENTION

In the prior art of detecting moving vehicles by electronic means it has been well known to use various types of energized circuitry whose operation is affected magnetically by the vehicle movement. It has also been known to use passive, that is, nonenergized sensing devices. The use of passive sensing devices presents many difficulties, however, because the signals to be detected are necessarily produced by the perturbation of the earth's magnetic field resulting from the vehicle movement, and the energy level is inherently very low.

Electrical signals are also acquired by the passive sensing device(s) from nearby power circuits and other sources, and the energy level of the undesired signals is often much higher than the energy level of the signals which are to be detected as representing vehicle movement. The desired signals generally fall in a very low frequency range, of 10 Hertz or less, and the undesired signals for the most part are at significantly higher frequencies (such as the typical power circuit frequency of 60 Hertz), hence it is possible to use frequency selection in the signal processor for excluding the greater part of these undesired signals. The use of such frequency selection is not novel here, but it does represent a system requirement which adds to the complexity of the total problem.

When using a passive sensor (or sensors) another complicating factor is that the circuit response is significantly affected by the degree, if any, to which the vehicle may be magnetized. The movement of a nonmagnetized vehicle typically produces a bipolar output pulse. If the vehicle is heavily magnetized, however, the output pulse that is initially produced may be of opposite polarity and may differ significantly in amplitude and frequency. The successful detection of the vehicle movement, of course, requires an appropriate response whether the vehicle is heavily magnetized, magnetized to some lesser degree, or not magnetized at all.

Another difficulty with passive sensors is that the signals which it is desired to detect have such a low energy level that the presence of thermal noise in the circuit makes the detection of the desired signals very difficult.

Another objection to passive sensors as used heretofore has been that inadvertent grounding of the sensor has rendered it inoperable.

A further objection to passive sensors as used heretofore has been that they were difficult and expensive to install.

SUMMARY OF THE INVENTION

According to the present invention a sensing device is utilized which consists of a passive loop having physical dimensions which are large relative to the length of the vehicle whose movement is to be detected. The loop is physically positioned so that the plane of the loop is generally parallel to the roadway surface, and this may be accomplished by supporting the loop in the air above the space through which the vehicle will pass, or by fastening it on the surface of the roadway, or by burying it beneath the roadway surface. The sensing loop is provided with a low electrical impedance, and this is accomplished by using a relatively small number of conductor turns and using a conductor having a sufficiently large cross-sectional area so that its resistance per unit length is low.

The significance of the relatively large dimensions of the sensing loop is that the vehicle first passes over one portion of the perimeter of the loop in entering the area inside the loop, then passes over another portion of the perimeter in leaving the loop area, and the separate responses derived in entering and in leaving the loop area are clearly distinguished from each other. The width of the loop when measured in the direction of vehicle movement does not have to be greater than the length of the vehicle, or even equal to the length of the vehicle, but it must be at least comparable to the vehicle length. More specifically, for a conventional automobile having a length of about 15 feet, it is necessary for the two sides of the loop to be separated by at least 5 feet in order to obtain a usable and reliable response. When the width of the loop is less than the vehicle length the two separate signals generated in the two sides of the loop are mixed together, which is satisfactory in some applications but not in others.

While the present invention is primarily directed toward the detection of automotive vehicles, it may also be utilized for other purposes. For example, a different application of the invention is as a surveillance system for mental hospitals. Each patient of the hospital is equipped with an ankle bracelet containing a small magnet, and this ankle bracelet then becomes "the vehicle." The dimensions of the sensing loop approximate the dimensions of a welcome mat at a doorway, such as 2 feet by 3 feet. One response is produced as "the vehicle" enters the loop area, and another separate response is produced as it leaves the loop area.

For applications where the diameter of the loop is rather small, as in the hospital application, the "small number of conductor turns" used in the loop may be 100 turns or perhaps more. But in the detection of motor vehicles, where the loop width is greater, the number of conductor turns is preferably 10 or less. For motor vehicle detection it is actually preferred to use three conductor turns, or two turns, or a single turn, and the specific engineering considerations are different depending upon the exact number of turns being used.

DRAWING SUMMARY

FIG. 1 is a vertical cross-sectional view showing the movement of a ferromagnetic object relative to an underground sensing loop;

FIG. 2 is a view like FIG. 1 but showing the sensing loop suspended in air above the ferromagnetic object;

FIG. 3 is a top plan view of a sensing loop used in a large service station installation;

FIG. 4 is a top plan view of a highway installation used for measuring the length of vehicles traveling in the truck lane;

FIG. 5 is a top plan view of a highway installation used for measuring vehicle speed;

FIG. 6 is a top plan view of a highway installation used for counting the numbers of passing vehicles; and FIGS 7a and 7b are a detailed schematic circuit diagram of the signal processor and output circuit used in the service station application shown in FIG. 3.

LOOP CONFIGURATIONS

Figure 7B:
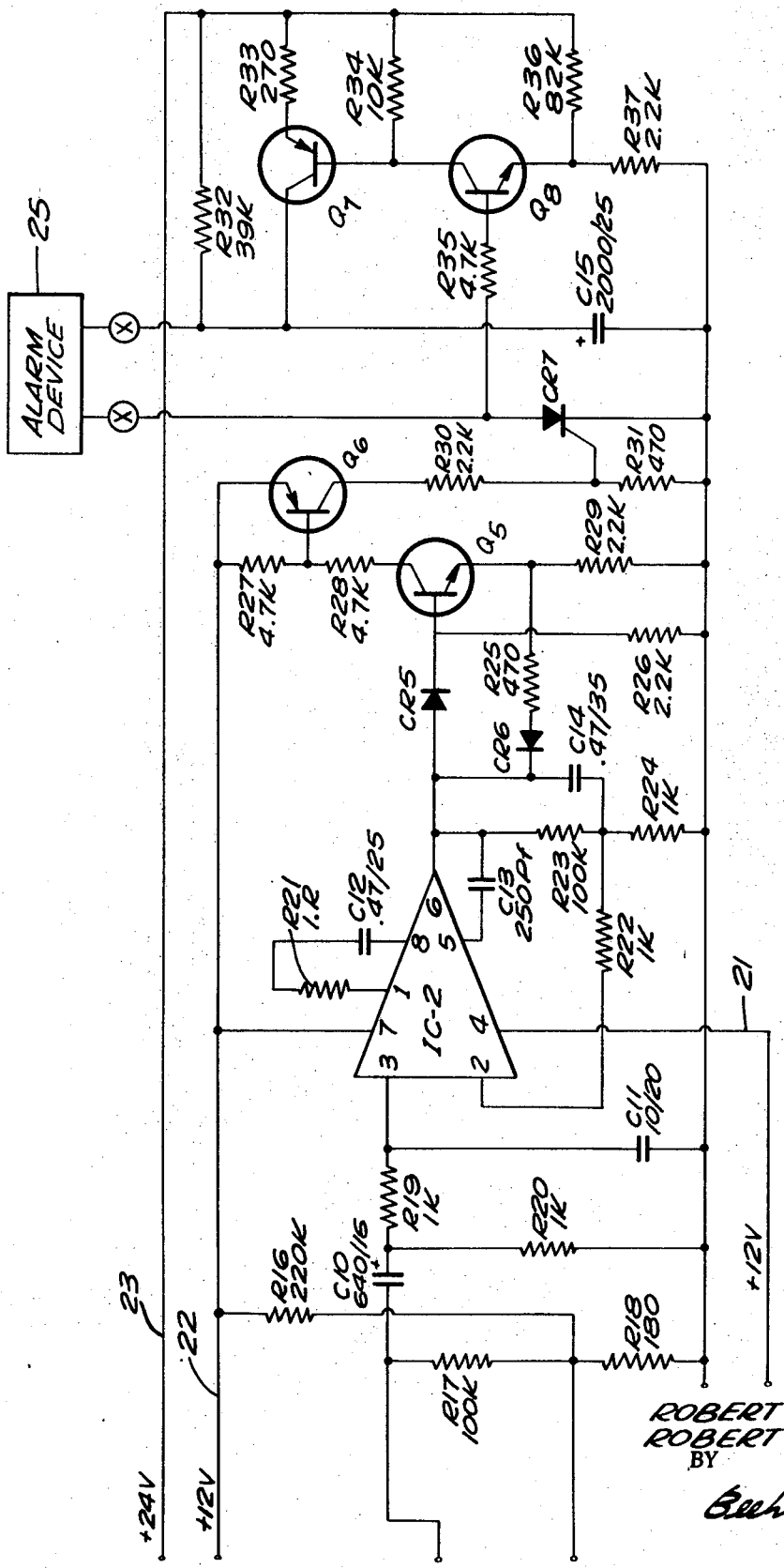

FIG. 1 shows an underground loop 11 consisting of three conductor turns buried beneath a roadway surface 10. A vehicle F (which may in general be any type of ferromagnetic object) travels along the roadway surface, creating one separate response as it enters the loop area and another separate response as it leaves the loop area.

FIG. 2 shows the same generalized arrangement as FIG. 1, and the operation is exactly the same, the physical difference being that a three-conductor loop 11a is suspended in air above the space through which the vehicle F passes.

FIG. 3 is a top plan view of a service station installation in which the sensing loop 11b is square, having a length of about 175 feet on each side. Vehicles F are shown entering and leaving the loop area at various locations, and the operation of the complete system including the signal-processing circuit FIGS 7a and 7b is such as to actuate the bell or other alarm device 25 each time that a vehicle enters the loop area and each time that a vehicle leaves the loop area.

FIG. 4 illustrates a highway installation, the highway having Lane 1, Lane 2, and Lane 3 of traffic which travel in a common direction. The sensing loop 11c is buried beneath the roadway surface under Lane 3, which is the outer lane in which the slower traffic including truck traffic generally travels. The loop 11c has a rectangular configuration, being about eight to ten feet wide so that the two long sides of the loop are located within the outer edges of Lane 3 of traffic. The length of loop 11c is 65 feet, so that its two end portions (each being eight to 10 feet long) extend transversely of Lane 3 and are spaced apart by a distance of 65 feet. A separate response is generated as the vehicle encounters each of the two ends of the loop, and if the vehicle is shorter than the length of the loop than these two separate responses do not become mixed together in the signal-processing unit. However, if the vehicle is the same length as the loop, or is longer than the loop, then the two otherwise separate responses do become mixed together. In the example shown the loop length of 65 feet is selected on the basis of being the maximum legal length for a truck unit. A special selection circuit, not presently illustrated in detail, is incorporated into the signal-processing unit for distinguishing the situation where the length of the truck is greater than the length of the loop, i.e., longer than the law allows.

FIG. 5 illustrates a highway installation for measuring vehicle speed. Sensing loop $11d$ is illustrated as being of elongated rectangular configuration and buried under Lane 3; loop $11e$ is of similar configuration and buried under Lane 2; and loop $11f$ is also of like configuration and buried under Lane 1. Each of these loops is coupled to a separate signal processing unit, not specifically illustrated herein. Each signal-processing unit is equipped with circuitry for measuring the time delay between the two separate responses, and hence the vehicle speed. While the lengths of the loops as shown in FIG. 5 appears to be less than 65 feet, it will be understood that it is preferred to use loops which are longer than 65 feet. The speed-measuring equipment is a manned operation, and the skill of the operator is required to separate recorded pulses indicating the speed of a particular vehicle.

FIG. 6 illustrates a highway installation for counting the numbers of vehicles. The signal loop $11g$ is wide enough to cover three lanes of traffic, and has a length in the direction of traffic flow of about 8 feet. The passage of each vehicle produces two separate pulses, hence the counting circuit associated with the signal processor produces an apparent count which must be divided by two in order to achieve a true count. Of course, this apparatus is susceptible to inaccuracy when two vehicles in two separate lanes cross the processing loop at exactly the same time, but that defect also exists in previously known types of counters.

When the suspended loop of FIG. 2 is used for automotive vehicles, more than three conductor turns are required because the top part of the automobile does not generate as strong a signal as the bottom part.

In the service station installation of FIG. 3 the loop $11b$ preferably includes three conductor turns and has a resistance value of about one-half ohm.

It will be understood that in each type of installation the ends of the sensing loop are coupled to the signal-processing unit by means of a shielded cable.

CIRCUIT DESCRIPTION

Sensing Loop

As ferromagnetic object F travels across periphery of the loop 11, the resulting perturbations of the earth's magnetic flux cause a small electromotive force (EMF) to be generated in the turns of the loop, which is applied through an appropriate two-wire signal conductor to terminals R and B of the signal processor. $R_{13}$ and $C_5$ form a low-pass filter to remove powerline and other disturbances, which would otherwise tend to activate the circuitry.

Integrating Amplifier

IC-1 in conjunction with $R_{17}$, $R_{18}$ and $C_9$ form an integrating amplifier, which transforms the signal whose amplitude is directly proportional to the object's speed, into a voltage of constant amplitude, over a range of speeds from approximately 2 to 40 miles per hour. $R_{16}$ is used to offset the amplifier IC-1 so that the signal may be coupled to a second amplifier IC-2 through a polarized electrolytic capacitor $C_{10}$.

Low Pass Amplifier

IC-2 in conjunction with $R_{23}$, $R_{24}$, and $C_{14}$ forms a low-pass amplifier, which increases the signal but further rejects interference from AC power and other sources. Resistors $R_{19}$ and $R_{20}$ form a DC return for IC-2, while $R_{19}$ and $C_{11}$ form a low-pass filter for interference rejection. Components $R_{14}$, $R_{15}$, $R_{21}$, $R_{22}$, $C_6$, $C_8$, $C_{12}$ $C_{13}$ are employed to stabilize IC-1 and IC-2.

Threshold-responsive Trigger Circuit

The circuitry consisting of $CR_5$, $CR_6$, $Q_5$, $Q_6$, $R_{25}$, $R_{26}$, $R_{27}$, $R_{28}$, $R_{29}$, $R_{30}$ and $R_{31}$ forms a a trigger circuit and operates as follows: If the output signal of IC-2 (pin 6) goes positive to a value exceeding 1.4 volts, $CR_5$ is caused to conduct to the base electrode of $Q_5$, which in turn causes $Q_6$ to conduct. If the signal goes negative to a value less than 1.4 volts, $CR_6$ is caused to conduct through the emitter electrode of $Q_5$, which in turn causes $Q_6$ to conduct. Conducting of $Q_6$ causes a positive voltage to be produced across $R_{31}$, which when the value exceeds the firing potential of the gate electrode of $CR_7$, a silicon-controlled rectifier, $C_{15}$ is discharged through an output circuit. In the particular application to a service station as illustrated in FIGS. 3 and 7, the output circuit is an alarm device 25 such as a bell solenoid or relay.

Output (Alarm) Circuit

Triggering of $CR_7$ causes its anode potential to be reduced to about 0.8 volt, which back biases $Q_8$ by means of voltage divider $R_{36}$ and $R_{37}$. When $Q_8$ is in its cutoff state, $Q_7$ eases to conduct current from the power supply and, therefore, $C_{15}$ is discharged nearly completely except for a small amount produced through $R_{32}$. $R_{32}$ is sufficiently large so that $CR_7$ will cease conduction when $C_{15}$ is discharged, whereupon $C_{15}$ begins recharging through $R_{32}$ until sufficient voltage is produced on $C_{15}$ through the alarm device to cause $Q_8$ to begin conduction. When $Q_8$ turns on, $Q_7$ turns on and $C_{15}$ is then very quickly recharged for the next alarm. This circuit action serves two purposes in that it assures that $CR_7$ will stop conducting when the signal disappears and also eliminates nuisance effects of multiple alarms for a single target.

Power Supply Circuit

Regulated power for the circuitry is supplied from $T_1$ through $CR_1$, $CR_4$ positive voltage regulator $C_1$, $C_3$, $R_1$, $CR_3$, $R_8$, $R_3$, $R_7$, $R_9$, $R_{10}$, $Q_1$, $Q_2$, and negative voltage regulator $C_2$, $C_4CR_4$, $R_4$, $R_5$, $R_6$, $R_8$, $R_{11}$, $R_{12}$, $Q_3$, $Q_4$. The regulators operate in complementary fashion in that $Q_1$ and $Q_3$ are series pass elements, $CR_3$ and $CR_4$ are voltage references for $Q_2$ and $Q_3$ amplifiers and $R_9$, $R_{10}$ and $R_{11}$, $R_{12}$ set the output voltage of the regulators at 13 volts. $R_1$ and $R_8$ are feed-forward elements, which are chosen to eliminate ripple and noise voltages occurring across $C_1$ and $C_2$ by injecting these voltages into $Q_2$ and $Q_3$ base electrodes, which invert these voltages and cancel them out through $Q_1$ and $Q_4$. $R_7$ and $R_8$ are bias resistors for $CR_3$ and $CR_4$.

What is claimed is:

1. Apparatus for detecting the movement of a vehicle on a roadway by interaction between the vehicle and the earth's magnetic field, comprising:

a low-impedance passive sensing loop disposed in a fixed position relative to the earth, the plane of the loop being generally parallel to the roadway surface and the loop width hem measured in the direction of vehicle movement being at least comparable to the vehicle length, for producing each time that the vehicle moves over a portion of the perimeter of the loop at least one bipolar output pulse whose polarity is determined by whether the vehicle is entering or leaving the loop and whether or not the vehicle is heavily magnetized;

means coupled to said sensing loop for amplifying and integrating said output pulse so as to produce a bipolar output signal whose amplitude is substantially independent of the vehicle speed;

threshold-responsive trigger circuit means coupled to said amplifying and integrating means and responsive to said bipolar output signal, when having sufficient amplitude, for producing a trigger signal indicative that the vehicle has closely approached a position above the loop perimeter; and an output circuit coupled to said trigger circuit means and actuated by said trigger signal.

2. Apparatus as claimed in claim 1 wherein said trigger circuit is responsive to either polarity of said bipolar output signal.

3. Apparatus as claimed in claim 1 wherein said sensing loop consists of from one to 10 conductor turns.

4. Apparatus as claimed in claim 1 wherein said sensing loop consists of a single conductor turn.

5. Apparatus as claimed in claim 1 wherein the impedance of said loop is of the order of 1 ohm.

6. Apparatus as claimed in claim 1 wherein said sensing loop is buried beneath the roadway surface.

7. Apparatus as claimed in claim 1 wherein said sensing loop is supported in a elevated position, and the vehicle passes beneath it.

8. Apparatus as claimed in claim 1 wherein said sensing loop is arranged in a generally rectangular configuration with two sides thereof being generally perpendicular to the direction of vehicle movement.

9. Apparatus for detecting the movement of a vehicle on a roadway by interaction between the vehicle and the earth's magnetic field, comprising:

a low-impedance passive sensing loop consisting of from one to 10 conductor turns buried beneath the roadway surface, the plane of the loop being generally parallel to the roadway surface and the loop width when measured in the direction of vehicle movement being at least comparable to the vehicle length, for producing each time that the vehicle moves over a portion of the perimeter of the loop at least one bipolar output pulse whose polarity is determined by whether the vehicle is entering or leaving the loop and whether or not the vehicle is heavily magnetized;

means coupled to said sensing loop for amplifying and integrating said output pulse so as to produce a bipolar output signal whose amplitude is substantially independent of the vehicle speed;

threshold-responsive trigger circuit means coupled to said amplifying and integrating means and responsive to either polarity portion of said bipolar output signal, when having sufficient amplitude, for producing a trigger signal indicative that the vehicle has closely approached a position above the loop perimeter; and an output circuit coupled to said trigger circuit means and actuated by said trigger signal.

10. Apparatus as claimed in claim 9 wherein said sensing loop is arranged in a generally rectangular configuration with two sides thereof being generally perpendicular to the direction of vehicle movement.